(12) United States Patent
Bart et al.

(10) Patent No.: US 10,270,959 B1
(45) Date of Patent: Apr. 23, 2019

(54) CREATING PREVIEW IMAGES FOR CONTROLLING PAN AND TILT CAMERAS

(71) Applicant: Alarm.com Incorporated, Vienna, VA (US)

(72) Inventors: Gary Franklin Bart, Weston, FL (US); Mehmet Erdal Caglayan, Fort Lauderdale, FL (US)

(73) Assignee: Alarm.com Incorporated, Tysons, VA (US)

(*) Notice: Subject to any disclaimer, the term of this patent is extended or adjusted under 35 U.S.C. 154(b) by 210 days.

(21) Appl. No.: 14/930,355

(22) Filed: Nov. 2, 2015

Related U.S. Application Data

(60) Provisional application No. 62/074,564, filed on Nov. 3, 2014.

(51) Int. Cl.
| | |
|---|---|
| H04N 7/18 | (2006.01) |
| H04N 5/225 | (2006.01) |
| H04N 5/232 | (2006.01) |
| G03B 17/18 | (2006.01) |
| G06T 3/40 | (2006.01) |

(52) U.S. Cl.
CPC ....... *H04N 5/23216* (2013.01); *G06T 3/4038* (2013.01); *H04N 5/23206* (2013.01); *H04N 5/23293* (2013.01); *H04N 7/183* (2013.01); *G06T 2200/32* (2013.01)

(58) Field of Classification Search
CPC .... G06F 3/048; H04N 21/6587; H04N 5/232; H04N 5/23203; H04N 5/23238; H04N 5/23296; H04N 21/21805; H04N 21/47217; H04N 5/23222; H04N 5/23216; H04N 7/18; H04N 21/2187; H04N 7/183; H04N 21/4223; G06T 11/203; G06T 3/4038; G08B 13/1963; G08B 13/19682
See application file for complete search history.

(56) References Cited

U.S. PATENT DOCUMENTS

| | | | | |
|---|---|---|---|---|
| 4,688,105 | A * | 8/1987 | Bloch | G07F 17/0042 360/137 |
| 2001/0044751 | A1* | 11/2001 | Pugliese, III | G06Q 30/02 705/14.1 |
| 2002/0054211 | A1* | 5/2002 | Edelson | G06T 7/20 348/169 |
| 2007/0025723 | A1* | 2/2007 | Baudisch | G03B 13/02 396/287 |
| 2010/0245532 | A1* | 9/2010 | Kurtz | G06K 9/00711 348/14.03 |

(Continued)

*Primary Examiner* — Alison Slater
(74) *Attorney, Agent, or Firm* — Fish & Richardson P.C.

(57) ABSTRACT

Movements of a pan and tilt camera may be controlled by generating preview images of the view obtained by the camera in a particular direction. A camera may periodically scan its environment by moving through its range of motion and capturing a series of frames that can be stitched together. The resulting preview image may be a panoramic or spherical representation of the camera's possible viewpoints and may be displayed on a user interface for controlling the camera remotely. A live video from the camera may be displayed, and when a request to move a viewing angle of the camera is displayed, a corresponding portion of the preview image for the new viewing angle is displayed until a live video of the camera for the new viewing angle is available.

20 Claims, 5 Drawing Sheets

(56) References Cited

U.S. PATENT DOCUMENTS

| | | | | |
|---|---|---|---|---|
| 2012/0307082 | A1* | 12/2012 | Thiruvengada | H04N 5/23206 348/207.99 |
| 2015/0222860 | A1* | 8/2015 | Gottschlag | G08B 13/1963 348/153 |
| 2015/0326828 | A1* | 11/2015 | Ming | H04N 7/181 348/159 |
| 2016/0010312 | A1* | 1/2016 | Kurihara | E02F 3/435 701/36 |

* cited by examiner

CREATING PREVIEW IMAGES FOR CONTROLLING PAN AND TILT CAMERAS

CROSS-REFERENCE TO RELATED APPLICATIONS

This application claims the benefit of U.S. Provisional Patent Application No. 62/074,564 filed on Nov. 3, 2014 and entitled "CREATING PREVIEW IMAGES FOR CONTROLLING PAN AND TILT CAMERAS," which is incorporated herein by reference in its entirety.

TECHNICAL FIELD

This disclosure relates to camera control.

BACKGROUND

Many people equip homes and businesses cameras for surveillance. The movement of some cameras may be controlled to control a view of the camera. For example, some cameras may pan or tilt.

SUMMARY

Techniques are described for controlling a camera.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Methods and techniques are described herein for controlling the movements of a pan and tilt camera by generating preview images of the view obtained by the camera in a particular direction. In some implementations, the pan and tilt camera is a pan, tilt, and zoom (PTZ) camera that is usable for monitoring and surveillance. For example, the pan and tilt camera can be used as a surveillance camera at a home, business, vacation, or any other property. The described device and techniques can perform continuous panning and/or tilting in a desired direction. Thus, the pan and tilt camera can view an object moving continuously around the camera without the need to reverse pan or tilt directions to return to an initial starting position before continuing to pan or tilt in the original direction. Such reversing is typical in pan and tilt cameras, as such cameras are typically limited by the wired connections internal to the product. The pan and tilt camera can provide a compact device that is capable of performing surveillance and monitoring operations without the rotational limitations of prior designs, while also providing an alternative to traditional pan and tilt cameras that is more visually appealing and is quieter during operation.

Pan and tilt cameras are typically IP- or cloud-based and typically send video images over networks for a user to view on a remote device, such as, for example, a smartphone, a tablet, a laptop computer, etc. In some examples, to adjust the angle of view of the camera, a camera control application can provide a mechanism whereby the user can input a control command to pan or tilt the camera in any particular desired direction. The user interface control for such control applications can, for example, include a joystick-like pad that accepts commands to move the camera in any desired direction, such as, for example, up, down, left, right, or at an angle. Alternatively, some camera control applications enable the user to tap on the particular part of the image currently being viewed and the camera can respond by automatically centering the view on the point where the user tapped.

Due to the time delay (latency) associated with sending video feed (e.g., a stream of large image or video files) over networks, a camera movement command entered by the user may take an appreciable amount of time to reach the camera. After receiving the command signals, the camera can begin to move in response to the user command, and it then takes an additional amount of time, (e.g., several seconds) for the video being displayed on the remote viewing device (e.g., the user smartphone) to show the new view angle. Because the pan and tilt camera can rotate through 360° and tilt as much as 180°, and given that most cameras have a field of view of 90°, the user is not able to view all possible areas the camera could point to at one time, and the users view is typically limited to approximately 90°. Therefore, the user has to enter a series of commands to reorient the pan and tilt camera. Because of the inherent delay associated with movement of the pan and tilt camera, the user often over and/or undershoots the intended angle of view and corrective commands have to be entered to ameliorate the problem. Hence, such methods for remotely controlling the pan and tilt camera can often be frustrating and time-consuming for the user, thus adversely affecting the user experience of remotely controlling the pan and tilt camera.

Accordingly, methods and apparatus may remotely control the movements of cameras with significantly reduced time delays and improved accuracy of control. In this regard, a camera may periodically scans its environment by moving through its range of motion and capturing a series of frames that can be stitched together. The resulting preview image may be a panoramic or spherical representation of the camera's possible viewpoints and may be displayed on a user interface for controlling the camera remotely. A user may touch the screen over a portion of the preview image of interest and the interface may replace the preview image with live video corresponding to the viewpoint selected.

Techniques are described for remotely controlling the movements of a data acquisition device. In particular, but not by way of limitation, examples described herein relate to methods and apparatus for remotely controlling the movements of a pan and tilt camera and allowing the camera to periodically scan its environment by moving through the entirety of its range of motion, or a portion thereof.

As used herein, and unless stated otherwise, the terms "pan and tilt camera" and "camera" can be used interchangeably to refer to an image acquisition device that can tilt and rotate along a set of angles to acquire video and static images.

Figure 1:
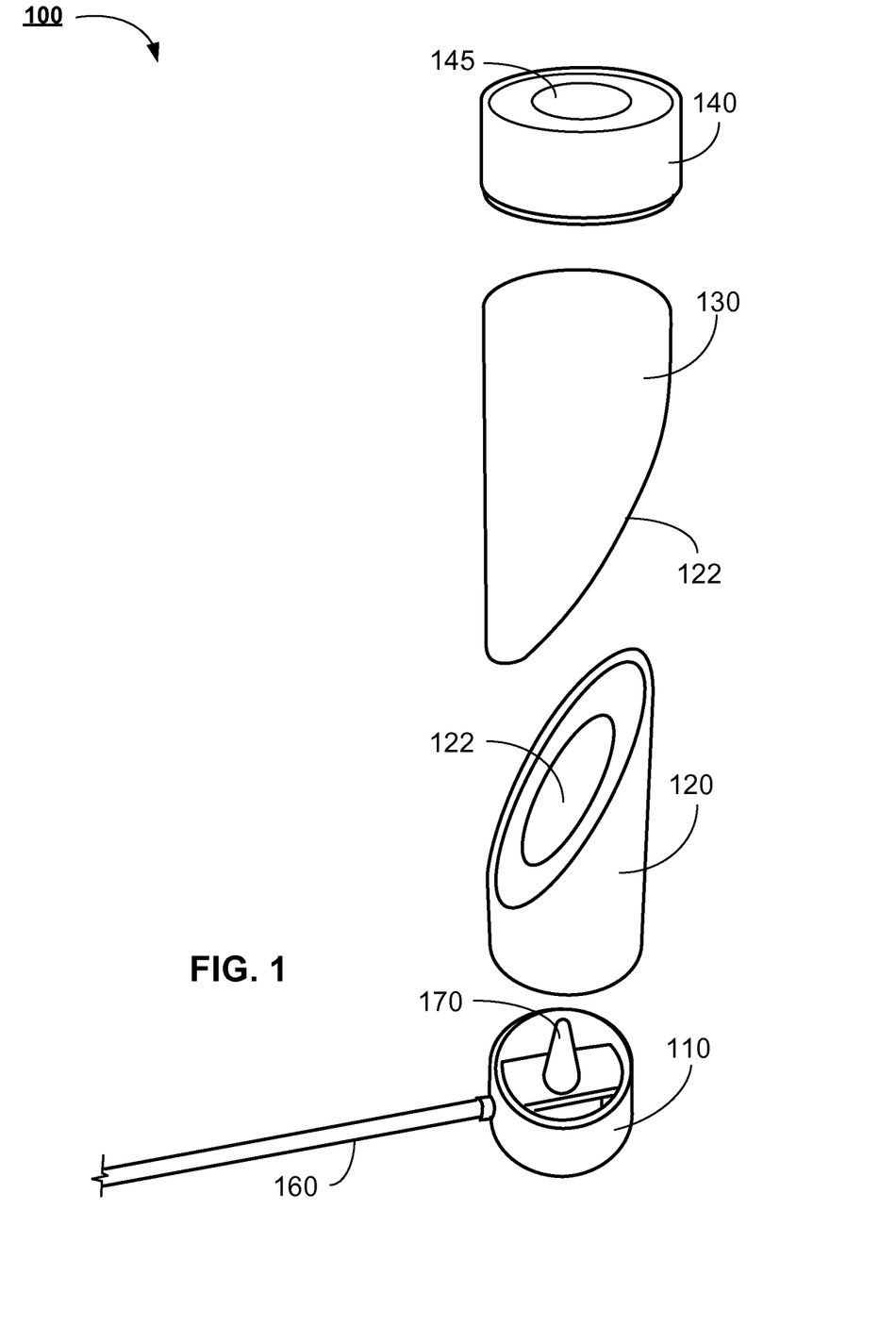
FIG. 1 is a schematic diagram of an exploded view of an example pan and tilt camera.
Figure 2A:
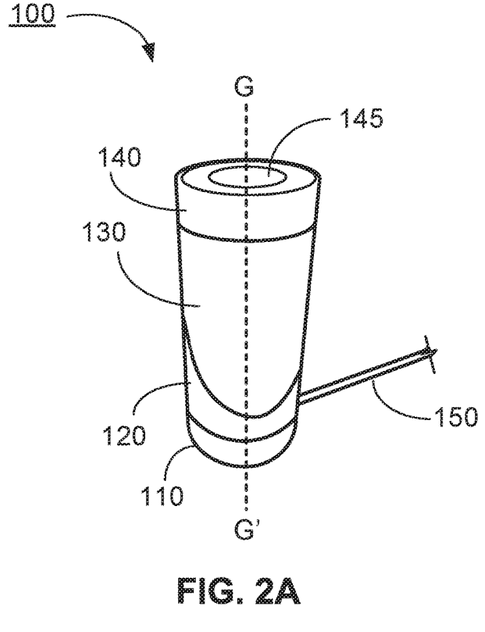
FIGS. 2A, 2B, 2C and 2D are images of the example pan and tilt camera from different orientations.
Figure 2B:
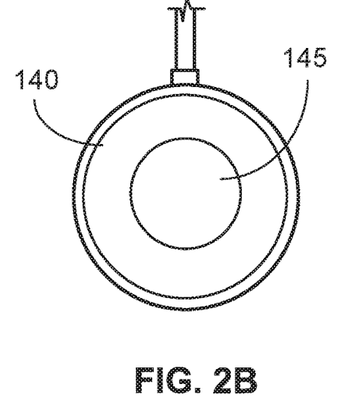
Figure 2C:
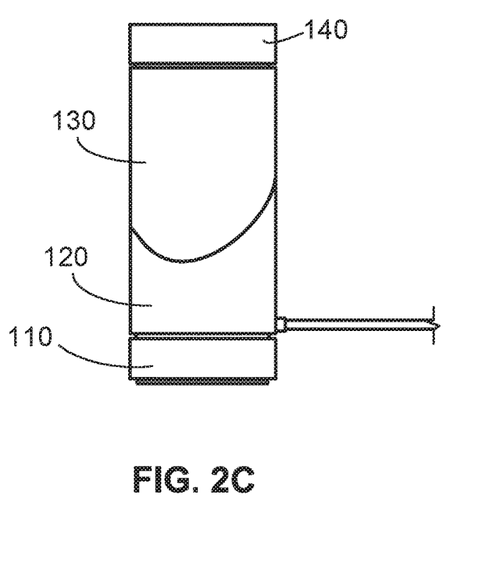
Figure 2D:
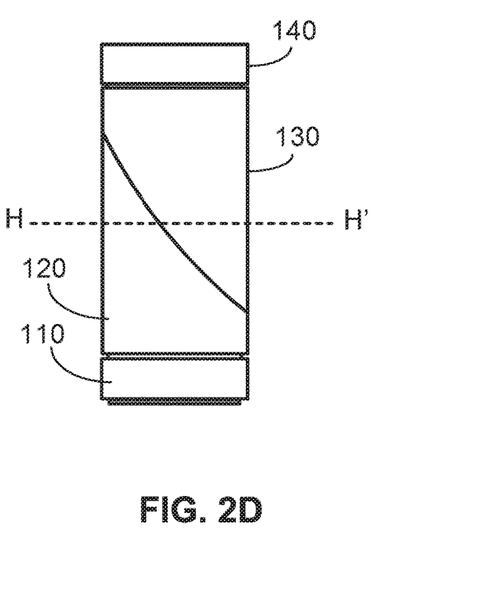

FIG. 1 illustrates an example pan and tilt camera 100. The pan and tilt camera 100, as shown, includes an upper portion that includes four outer sections: a base 110, lower body 120, upper body 130, and lens housing 140 that can, in some implementations, cumulatively form a cylindrical structure. The base 110 is also connected to a power cable 160, and features a slip ring 170 for coupling the electrical power supplied by the power cable 160 to the functional components of the camera 100 without the need for a wired connection. The sections of the pan and tilt camera 110-140 (e.g., base, upper and lower body sections, and lens housing) may be formed in any number of materials, such as any plastic, metal, alloy, composite material, ceramic material, or other material. In some implementations, the pan and tilt camera 100 can feature a fixed base 110, where the fixed base 110 is connected to a power cable functioning to provide a power source to the camera 100. The base 110 can be of a cylindrical or disk-like shape, having a flat bottom that enables the pan and tilt camera 100 to be mounted to or sit on a surface, such as, for example, a ceiling, wall, roof, window sill, floor, table, etc. Connected to the base 110 is the lower body 120, which is, in turn, connected to the upper body 130. The lower and upper bodies 110-120 are formed such that the two bodies can, in some implementations, appear to form a single cylinder that has been transected at an angle 122. Attached to the upper body 130 is the lens housing 140, which can include the different components that enable the pan and tilt camera 100 to perform monitoring activities. For example, the lens housing 140 can feature one or more sensor devices 145 (e.g., one or more video cameras, still cameras, infrared cameras, night vision cameras, etc.) or other devices capable of capturing static images and/or video from the environment surrounding the pan and tilt camera 100. In some instances, the lens housing 140 can feature other electronics and circuitry required to operate the one or more camera devices. Furthermore, in some implementations, the lens housing 140 can also feature one or more other sensors, such as one or more microphones, motion sensors, contact sensors, light sensors, environmental or monitoring sensors, and/or the like.

The base 110 can be a fixed component of the camera 100, such that the base 100 is stationary while the camera 100 is performing pan or tilt operations. Additionally, the base 110 may feature a fixture configured to connect to a power cable 160 for providing electrical power to the camera 100. For example, the base 110 may feature an outlet or plug that allows a power cable 160 to be connected to the base 110, or a power cable 160 may be permanently connected to the base 110. The base 110 shown in FIG. 1 further features a slip ring 170 that can connect the power connection from the attached power cable 160 to the lower body 120 of the camera. In doing so, the camera 100 can perform continuous rotation about the vertical axis, without limitations caused by twisting or other issues associated with a corded connection from the base 110 to the lower body 120 of the pan and tilt camera 100.

The pan and tilt camera 100 can pan, e.g., rotate horizontally about a vertical axis, based on the lower body 120 rotating in a clockwise or counterclockwise direction with respect to the fixed base 110. The camera 100 can tilt, e.g., move in a direction that is about a horizontal axis, based on the upper body 130 rotating with respect to the lower body 120. Since the upper body 140 and lower body 130 are the transection portions of the cylindrical structure of the camera 100, the upper body 130 can move in an arc-like motion having components in both the vertical and horizontal directions. The lens housing 140 connected to the upper body 130 opposite the lower body 120 includes a sensor device 145 that is capable of capturing static images and/or video from the environment surrounding the pan and tilt camera 100.

FIGS. 2A-2D are images of the pan and tilt camera 100 from different orientations. The pan and tilt camera (or the camera) 100 includes a base 110, lower body 120, upper body 130, and lens housing 140 that can, in some implementations, cumulatively form a cylindrical structure. Referring to FIG. 1 and FIGS. 2A-2D, the cylindrical structure of the camera 100 is transected across its diameter along the vertical axis as represented by the line GG' in FIG. 1A (or perpendicular to the horizontal axis HH') to form the bottom section of the camera that includes the base 110 and the lower body 120. In some implementations, the base 110 may have a height that is approximately twenty percent of the total height of the cylindrical camera structure, with the other eighty percent being accounted by the lower body 120, upper body 130, and lens housing 140 sections. The cylindrical structure of the camera 100 is transected at an angle across its diameter, thereby forming the lower body 120 and upper body 130 of the camera 100. In some implementations, the angle between the horizontal axis HH' and the top of the lower body 120 may be in the range of 45 degrees to 55 degrees, or may be different depending upon the requirements of the application. In operation, the lower body 120 of camera 100 enables the camera 100 to pan, based on the lower body 120 of the camera rotating in a clockwise or counterclockwise fashion about the vertical axis GG'. The pan and tilt camera 100 can also tilt, e.g., move in an arc-like motion direction about a horizontal axis as represented by the line HH' in FIG. 1D.

Figure 3:
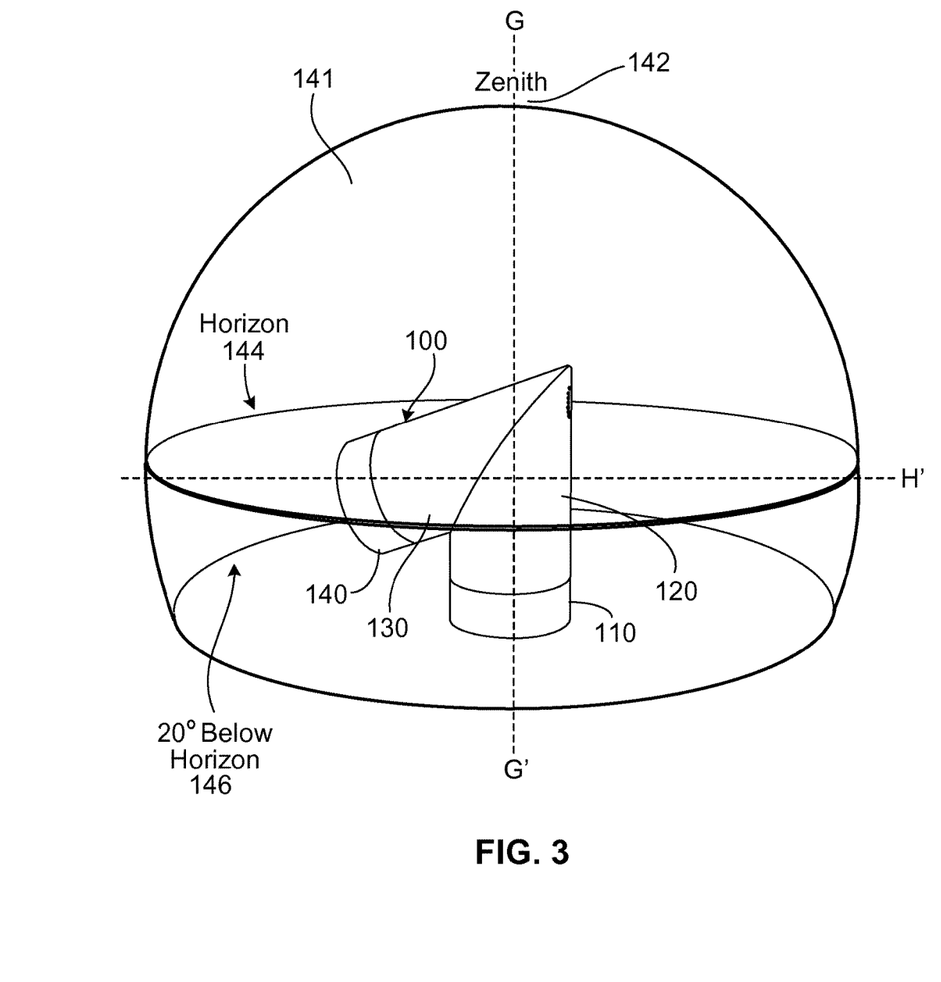
FIG. 3 illustrates an example of the possible fields of view of the pan and tilt camera when the pan and tilt capabilities of the camera are enabled.

FIG. 3 illustrates an example of the possible fields of view of the pan and tilt camera 100 when the pan and tilt capabilities of the camera are enabled. While these illustrations generally describe the capabilities of the pan and tilt camera 100 to monitor various fields of view, the specific fields of view available to the pan and tilt camera 100 according to this description may be dependent upon certain design characteristics of the pan and tilt camera 100. For instance, by changing the angle at which the cylindrical camera structure is transected to form the upper body 130 and lower body 120, the range of the tilt movement of the lens housing 140 may be adjusted.

The range of possible fields of view of the pan and tilt camera 100 may be described by a modified hemisphere 141, such that the possible fields of view of the pan and tilt camera 100 range from the zenith 142 of the modified hemisphere 141 (e.g., along the vertical axis represented by the line GG' passing through the pan and tilt camera 100) to a point 146 below the horizon 144 of the modified hemisphere 141 (e.g., a point below the horizontal axis HH'). The pan and tilt camera 100 is capable of performing imaging at any point along this range from the zenith 142 to the point near or below the horizon 144 and in any direction around the vertical axis GG', that is, the pan and tilt camera 100 can be capable of performing 360 degree imaging at any tilt that is described by the modified hemisphere 141.

FIGS. 2 and 3 illustrate example fields of view of the pan and tilt camera 100, as well as example configurations of the pan and tilt camera 100 that enable the camera 100 to achieve those fields of view. While these illustrations generally describe the capabilities of the pan and tilt camera 100 to monitor various fields of view, the specific fields of view available to a particular pan and tilt camera 100 according to this description may be dependent upon the particular design characteristics of the pan and tilt camera 100. The range of possible tilt positions of the camera can be specified based on the angle that the cylindrical body of the pan and tilt camera is transected 122. Generally, a steeper angle (e.g., an angle of fifty five degrees from the horizontal) allows the pan and tilt camera 100 to have a field of view that is further below the horizontal than a shallower angle (e.g., an angle of 45 degrees from the horizontal). For example, as shown in FIG. 3, the body of the cylindrical camera structure is transected at a fifty five degree angle relative to the horizontal axis HH', and is capable of performing tilt movements that range from the zenith 142 of the modified hemisphere 141 to a point that is twenty degrees below the horizontal 146. In contrast, if the cylindrical camera structure were transected at a forty five degree angle, the range of possible tilt movements would be only from the zenith 142 of the modified hemisphere to a point at the horizon 144 (e.g., zero degrees below the horizon) of the modified hemisphere 141.

The pan and tilt camera 100 can use one or multiple wireless technologies to communicate with communication devices associated with users, such as, for example, servers, desktop computers, laptop computers, tablets, smart phones, cellular phones, web-enabled appliances, vehicles with internet capabilities, and/or the like. The pan and tilt camera 100 can include wireless port(s) in a communication interface to send and/or receive data units (e.g., data packets) via a variety of wireless communication protocols, such as, for example, a Wi-Fi® protocol, a Worldwide Interoperability for Microwave Access (WiMAX) protocol, a cellular protocol (e.g., a third generation mobile telecommunications (3G) or a fourth generation mobile telecommunications (4G) protocol), 4G long term evolution (4G LTE) protocol), and/or the like.

The pan and tilt camera 100 described in FIGS. 1-3 may be configured for mounting to any number of surfaces, such as a wall, ceiling, roof, window sill, or other surface. Generally, the pan and tilt camera 100 may be mounted such that the base 110 is fixed to the surface, with the cylindrical camera body 120-140 is generally being capable of mounting in any orientation. Mounting orientations of the cylindrical camera body 120-140 may be such that the base 110 is mounted to a surface parallel to the horizontal, for example, a ceiling or floor. The pan and tilt camera 100 may also be mounted to other surfaces that are vertical, such as a wall, or at an angle, such as on a slanted roof. In some instances, mounting of the pan and tilt camera 100 can utilize a mounting bracket. Mounting of the pan and tilt camera 100 can utilize a method similar to a drywall anchor, a wood screw, a concrete anchor, or other types of anchors. In some implementations, mounting of the pan and tilt camera 100 can utilize a unique type of mounting screw to enable the installation and subsequent removal of the camera.

Figure 4:
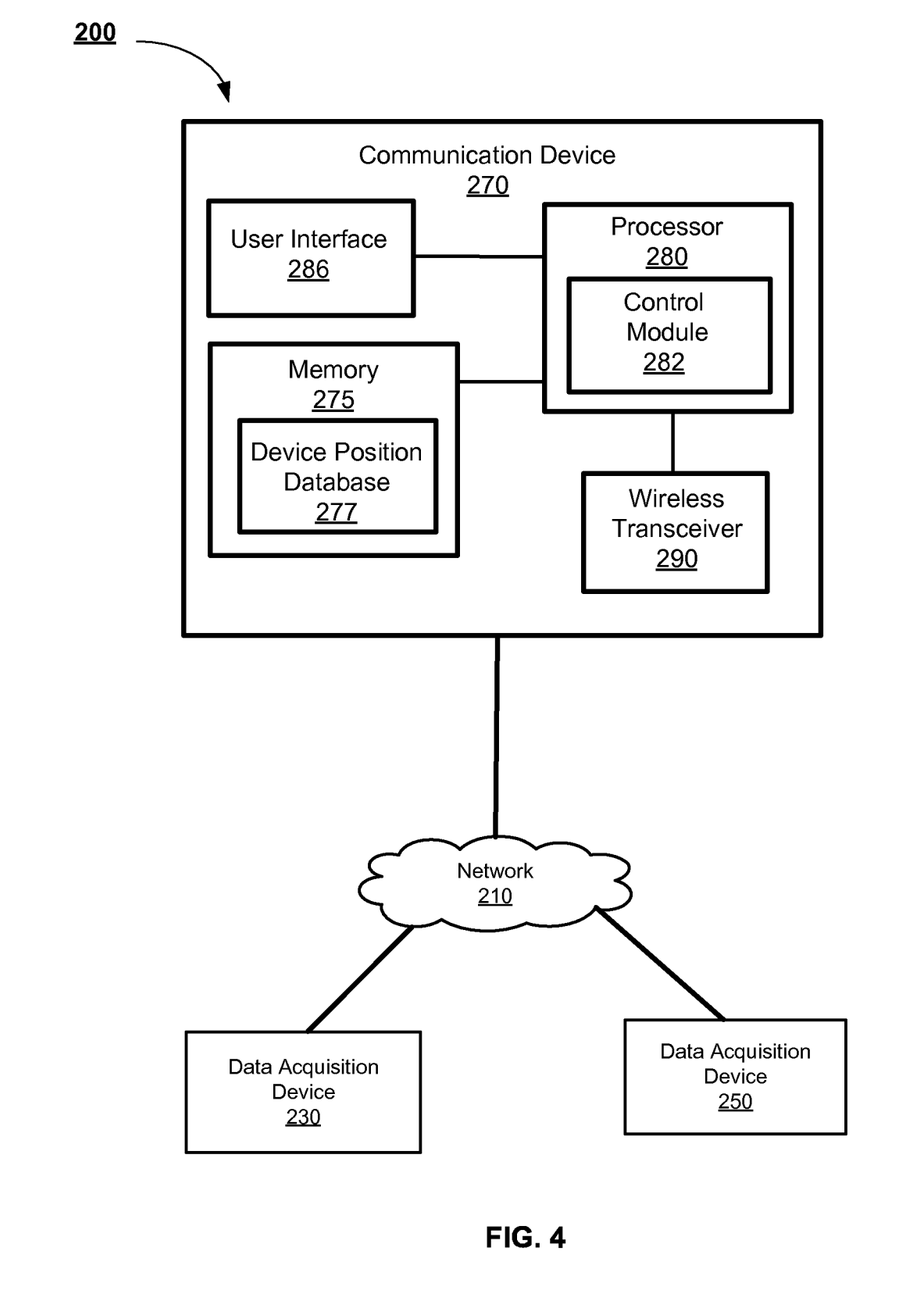
FIG. 4 is a schematic illustration of an example remote data acquisition control system.

FIG. 4 illustrates a remote data acquisition control system 200. The remote data acquisition control system 200 includes a network 210, data acquisition devices 230 and 250, and a communication device 270. The remote data acquisition control system 200 controls the movements of a data acquisition device 230 or 250 (e.g., a pan and tilt camera) by generating preview images of the view obtained by the data acquisition device 210 or 230 in a particular direction. The data acquisition device 230 and/or 250 can be, for example, a pan and tilt camera. The performance of the remote data acquisition control system 200 can be adjusted based on the particular location of the environment surrounding the data acquisition devices 230 and 250. FIG. 4 shows the communication device 270 to be operatively coupled to two data acquisition devices 230 and 250 as an example only. In other implementations, the communication device 270 can be operatively coupled to less than or more than two data acquisition devices 230 and 250. The network 210 can be any type of network (e.g., a local area network (LAN), a wide area network (WAN), a virtual network, and/or a telecommunications network) implemented as a wired network and/or a wireless network and can include an intranet, an Internet Service Provider (ISP) and the Internet, a cellular network, and/or the like.

The data acquisition devices 230 and 250 can be any analog and/or digital data acquisition devices, such as, for example, pan and tilt video cameras, fixed view video cameras, temperature sensors, humidity sensors, light level sensors, chemical sensors, and/or the like. The data acquisition devices 230 and 250 can be small, battery-operated devices that can use one or more of the wireless technologies described above to communicate with the communication device 270 (e.g., send or acquire data signals, receive command signals, etc.), and can be placed in various areas in and around an establishment (e.g., a home, an office, a school, a government building, a stadium, a concert hall, etc.). The data acquisition devices 230 and 250 can include wireless port(s) in a wireless transceiver to send and/or receive data units (e.g., data packets) using one or more of the wireless communication methods described above.

In some examples, the data acquisition device 230 or 250 can be a pan and tilt camera. In such examples, the data acquisition devices 230 and/or 250 are IP- or cloud-based devices that can transmit video imagery over the network 210 for a user to view on a communication device 270 that is remote to the location of the data acquisition device 230 or 250 (e.g., a smartphone, a tablet, etc.). The communication device 270 can be executing a control application (e.g., via the control module 282) that can be used by a user to remotely communicate with and control the data acquisition devices 230 and/or 250. In such examples, the data acquisition devices 230 and 250 can periodically scan the environment (e.g., by taking a series of images) by moving through the entirety of the range of motion of the data acquisition device 230 and/or 250 as described in FIG. 3), or a portion thereof. As the data acquisition devices 230 and/or 250 perform the scan, the data acquisition device 230 and 250 can capture a series of video frames that can be stitched together in an application executing on the data acquisition devices 230 and 250 or the communication device 270 (e.g., a remote "device control" application) that is used by the user to view the video images. The resulting image can be a panoramic or spherical representation of the entirety of the possible view points of the data acquisition devices 230 and/or 250.

The communication device 270 can be personal communication device such as a desktop computer, a laptop computer, a personal digital assistant (PDA), a standard mobile telephone, a smartphone, a tablet personal computer (PC), and/or the like. The communication device 270 can include a memory 275, a processor 280, a user interface 286, and a wireless transceiver 290. The communication device 270 can communicate with the data acquisition devices 230 and 250 via the wireless transceiver 290 using a variety of wireless communication protocols, such as, for example, a Wi-Fi® protocol, a Worldwide Interoperability for Microwave Access (WiMAX) protocol, a Bluetooth low energy technology (BTLE) protocol, a cellular protocol (e.g., a third generation mobile telecommunications (3G) or a fourth generation mobile telecommunications (4G) protocol), 4G long term evolution (4G LTE) protocol), and/or the like.

The memory 275 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some implementations, the memory 275 stores instructions to cause the processor 280 to execute modules, processes, and/or functions associated with the remote data acquisition control system 200. The memory 275 includes a device position database 277. The device position database 277 can be a look-up table that can store the home position of the data acquisition devices 230 and/or 250, the current position of the data acquisition devices 230 and/or 250, the current viewing angle of the data acquisition devices 230 and/or 250, an identifier associated with the data acquisition devices 230 and/or 250, the maximum range of motion of the data acquisition devices 230 and/or 250, the cloud cover in the location of the data acquisition devices 230 and/or 250, and/or the like.

The processor 280 can be a general purpose processor, a Field Programmable Gate Array (FPGA), an Application Specific Integrated Circuit (ASIC), a Digital Signal Processor (DSP), and/or the like. The processor 280 can be configured to run and/or execute user and/or application authorization processes and/or other modules, processes, and/or functions associated with the remote data acquisition control system 200. The processor 280 includes a control module 282. The control module 282 can be a hardware and/or software module (stored in memory 275 and executed in the processor 280) that can receive data transmitted by the data acquisition devices 230 and/or 250, process data received from the data acquisition devices 230 and/or 250 (e.g., filtering, cropping, etc.) and interact with the user interface 286 to send command signals to control position and functionality of the data acquisition devices 230 and/or 250.

The user interface (UI) 286 can include various types of input/output (I/O) devices-display outputs such as, for example, a cathode ray tube (CRT), light emitting diode (LED) screen, a liquid crystal display (LCD) screen, touch-sensitive display screens, and/or the like. The user interface (UI) 286 can include manually operated inputs such as a (real or virtual) keyboard and a mouse that allows user interaction to control the position and functionality of the data acquisition devices 230 and/or 250. For example, the user can provide alphanumeric and other inputs using the keyboard or provides inputs indicating position on the input/output (I/O) devices using the mouse or by tapping on a location in the input/output (I/O) device. The user interface (UI) 286 is operably coupled to the control module 282 that allows a real-time display of the current view of the data acquisition devices 230 and/or 250. This can help the user to provide a sequence of manual inputs which can lead to the results the user desires. Specifically, the user can use clicking, pointing, tapping and dragging operations at different spots on the input/output (I/O) devices-display outputs to remotely control the data acquisition devices 230 and/or 250.

The panoramic (or spherical) image can be displayed on a user interface (UI) 286 in the communication device 270 (e.g., user interface 286) and be used by the user to view the video images remotely. When the user desires to control the view angle of the data acquisition devices 230 and/or 250, the user can touch the screen of the UI 286 over the location of the video image the user is viewing (e.g., on the control application) and the control module 282 can replace the live video view with a preview image centered on the desired location. The user can interact with this image in real time, as the image can be stored locally on the communication device 270 (e.g., in the memory 275). The user can use touch interactions to swipe the image around on screen of the UI 286, and reorient the view to the desired view angle. In such implementations, when the user stops moving the image, the control module 282 can send a command signal (or a set of command signals) to the data acquisition devices 230 and/or 250 to reorient the devices to the new desired location (and orientation). The data acquisition devices 230 and/or 250 can then send video images from the new position (the new vantage point associated with the new orientation) associated with the new location of the data acquisition devices 230 and 250. When the video signals (or video images) sent by the data acquisition devices 230 and/or 250 is received by the communication device 270, the preview image displayed on user interface (UI) 286 can be replaced with the live video stream received from the data acquisition devices 230 and/or 250.

In some instances, a large degree of movement of the data acquisition devices 230 and 250 from their current locations might be desired. In such instances, the control module 282 of the communication device 270 can permit the user to enter multiple touches on the UI 286 that are desired for generating the large degree of movement. In such instances, the control module 282 may wait a pre-defined period of time (e.g., a few seconds) before sending the control signals (e.g., command signals indicating the data acquisition devices 230 and 250 to make the desired movements) to the data acquisition devices 230 and 250.

In order to coordinate the presentation of the preview image, the data acquisition devices 230 and 250 can periodically or substantially periodically determine its current view angle relative to a pre-determined home position and store the co-ordinates of the current position and current view angle in a database (e.g., in the memory of the data acquisition devices 230 and 250 and/or the device position database 277). The preview images are captured as a defined offset from this known (or pre-determined) home position. The data acquisition devices 230 and/or 250 report the current position to the control module 282 (e.g., running on the communication device 270) in, for example, terms of degrees of deviation from the home position for the "pan" field, and in degrees of azimuth from the home position for the "tilt" field. In some implementations, the location and view angle of the data acquisition devices 230 and/or 250 can be represented in Cartesian co-ordinates, and in other implementations, the location and view angle of the data acquisition devices 230 and/or 250 can be represented in spherical co-ordinates.

The control module 282 can then load the preview image on the UI 286 that is properly positioned to overlay the current view angle's live video. After the user has moved the preview image to the intended new view angle, the control module 282 can determine the degrees of movement and the direction of the desired movement as both horizontal and vertical deviation from the current location (e.g., the starting point) and/or the home position, and translate the data into a command signal(s) to be transmitted to the data acquisition devices 230 and/or 250 to move to the desired location relative to the home position. In some instances, the data acquisition device 230 and/or 250 can have the ability to detect if the data acquisition device 230 and/or 250 has been moved from its home position manually, for example, by being physically removed or disturbed from its location after the time the preview image was captured. In such instances, the data acquisition device 230 and/or 250 can capture a new preview image that is in proper arrangement with the new home position.

In some instances, the preview image and the live video image may look significantly different from one another. In one example, a user or any other person may have (intentionally or mistakenly) moved a prominent object (e.g., a piece of furniture) in the field of view (or out of the field of view) of the data acquisition device 230 and/or 250 at its home position. In another example, a person may have been present in the field of view when the preview image was originally captured and is not present during the time of a live video feed, or vice versa. Such occurrences can create an undesirable effect. The remote data acquisition control system 200 can implement two methods to overcome such events. In some instances, if the data acquisition device 230 and/or 250 can detect the presence of a person while obtaining the preview image, the data acquisition device 230 and/or 250 can generate the preview image at a time when no people are detected in the vicinity of the home position. The data acquisition device 230 and/or 250 can detect changes to the field of view by comparing images taken at a first time with images taken at a second time, where the second time is different than (e.g., after, before, etc.) the first time. The data acquisition device 230 and/or 250 periodically or substantially periodically scans its surroundings and, if data acquisition device 230 and/or 250 detects that a significant change has occurred within its field of view, the data acquisition device 230 and/or 250 can generate a new preview image.

In other instances, when only lighting changes are responsible for large differences between the live view image and the captured preview image, the data acquisition device 230 and/or 250 can present an altered preview image to the user such that only the major features in the field of view of the data acquisition device 230 and/or 250 are presented. For example, the preview image can be converted to a representation of the actual image wherein analytical methods (e.g., software processes) can be applied at, for example, the control module 282 to the preview image to detect areas of contrast in the image in such a way as to detect "edges" in the image (e.g., outline of doors, windows, furniture, etc.). The image can then be converted by, for example, the control module 282 into a black and white line drawing of the major room features and presented to the user in the UI 286 in lieu of a photorealistic image. In some instances, the control module 282 may provide a way for the user to limit the extent of range of motion of the data acquisition device 230 and/or 250 used to generate the preview image in the event that parts of the full range of view of the data acquisition device 230 and/or 250 are obstructed.

In some instances, alternative methods of transmitting command signals to the data acquisition device 230 and/or 250 can be used. In some examples, communication devices 270 (e.g., smartphones, tablets, laptop computers, etc.) have a combination of sensors such as, for example, accelerometers, gyroscopes, and magnetometers, that can provide the control module 282 with orientation information about the communication device 270. Hence, in such instances, the movements of the communication device 270 can be interpreted as input commands to reorient the data acquisition device 230 and/or 250 directly or reorient the data acquisition device 230 and/or 250 by displaying the preview image to provide more real-time feedback to the user. In effect, the user might stand with their communication device 270 in front of data acquisition device 230 and/or 250 and then, while viewing the video image, physically turn in a circle or raise or lower the communication device 270 such that the image displayed on the UI 286 would respond accordingly. This movement can, thus, reorient the data acquisition device 230 and/or 250 as though the user and data acquisition device 230 and/or 250 shared the same view angle.

In some instances, some of the methods described above can be used to orient the video stream or playback of recorded video from the data acquisition device 230 and/or 250 with a 180° fisheye or other similar lens. Such video images obtained by the data acquisition device 230 and/or 250 can be a panoramic, spherical, or partially spherical image, and the images can be stored in the communication device 270 and/or in the data acquisition device 230 and/or 250. The input command signals described above can be used to move the image around in the UI 286, thus providing the user with direct control of the viewpoint while viewing only a portion of the overall image that was captured. No preview image may be required for using such methods with the data acquisition device 230 and/or 250. Furthermore, the data acquisition device 230 and/or 250 can capture the entire 360° spherical image at once and the user can view less than the total image. In such instances, the user can be zoomed in on a portion of the image, and reorienting the communication device 270 or swiping with touch commands on the UI 286 can cause the portion of the spherical image being shown on the UI 286 to be reoriented using degrees of offset from the previous viewpoint (or current viewpoint).

Figure 5:
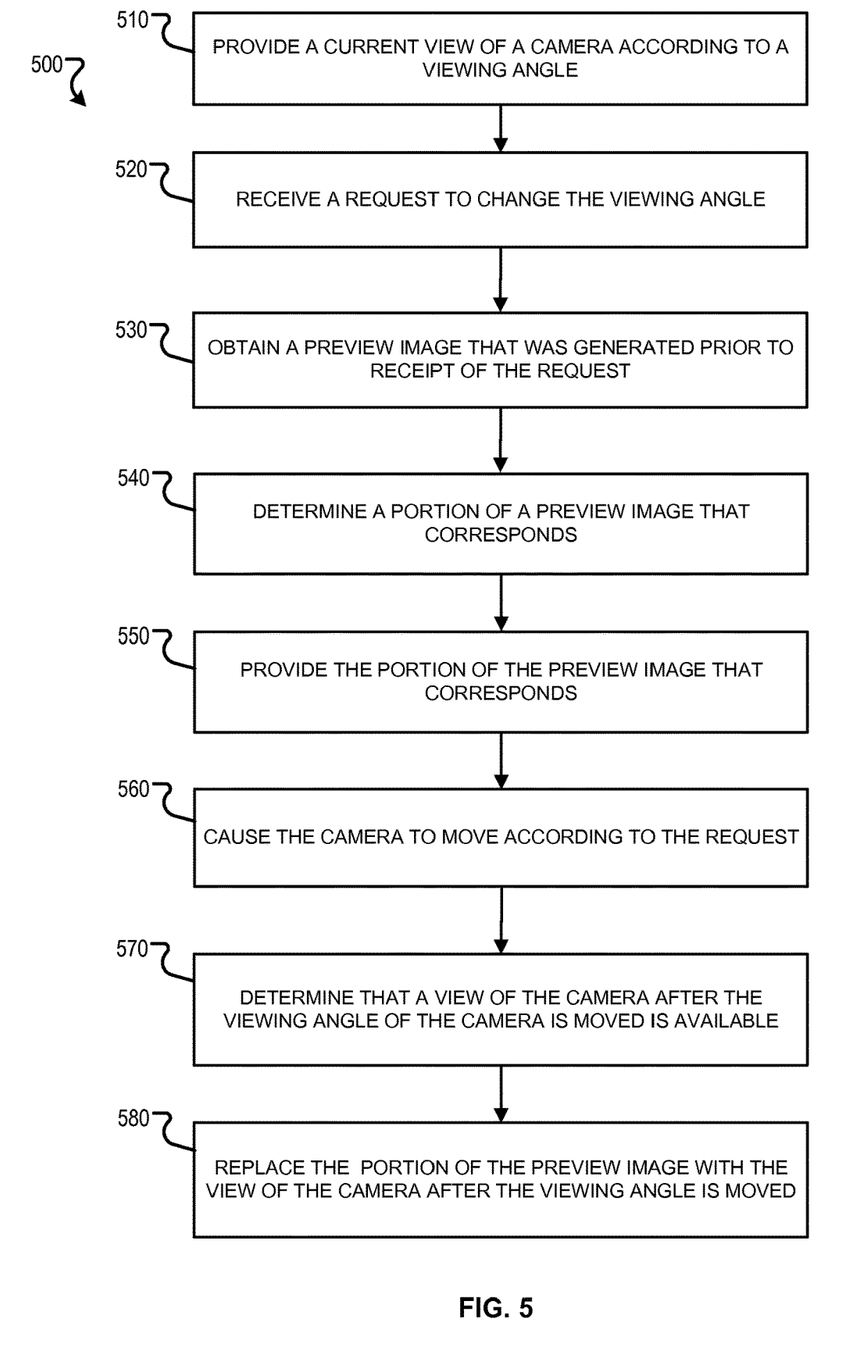
FIG. 5 is a flow chart of an example process.

FIG. 5 illustrates an example process 500 for controlling a camera. The operations of process 500 are generally described as being performed by communication device 270. In some implementations, operations of the process 500 may be performed by one or more processors included in one or more electronic devices.

The communication device 270 provides a current view of a camera according to a viewing angle (510). For instance, the communication device 270 may provide on a display of the communication device 270 a live video feed from the data acquisition device 230 while the data acquisition device 230 is at a viewing angle facing directly north parallel to the ground or another viewing angle.

The communication device 270 receives a request to change the viewing angle (520). For example, the communication device 270 may show the live feed in a graphical user interface on a display of the communication device 270 and receive a swipe from a user indicating that the user wishes to change the viewing angle of the live feed. For instance, a swipe may be a swipe to the upper right indicating to move the viewing angle right and upwards. In some implementations, the request may be received through a finger touch and drag on the live feed, a selection of arrows for moving the viewing angle, or some other input indicating to change the viewing angle.

The communication device 270 obtains a preview image that was generated, prior to receipt of the request to change the viewing angle, from views of the camera according to multiple different viewing angles (530). The communication device 270 may generate the preview image from multiple images taken by the data acquisition device 230 at different viewing angles that are stitched together. The preview image may be an image that includes more than a view of the data acquisition device 230 at a particular time. For example, the preview image may be a spherical image while the view of the data acquisition device 230 may be ⅛ of a sphere at a particular time.

The communication device 270 may determine to generate a preview image before receiving the request to change the viewing angle based on determining that no preview image exists or that a current view from the data acquisition device 230 is different from a corresponding portion of the preview image. Differences may arise, for example, because lighting conditions have changed, one or more objects in the view have moved, or the data acquisition device 230 has moved. The communication device 270 may determine differences based on comparing pixels in the current view and pixels in the corresponding portion of the preview image. In some implementations, the difference may be compared to a predetermined threshold difference to generate a preview image. For example, the predetermined threshold difference may be a 5%, 10%, or 15% difference.

In some implementations, the communication device 270 may determine to generate a preview image based on determining that a current view is not being displayed to a user on the communication device 270. In response, the communication device 270 may pan and tilt the data acquisition device 230 about the data acquisition device's 230 full range of motion to generate a new preview image as the current view is not being monitored by a user.

In some implementations, a current view of the data acquisition device 230 may appear to be different than a corresponding portion of the preview image. For example, the preview image may be a grayscale image or a black and white line drawing generated from images captured by data acquisition device 230. The difference may enable a user to clearly tell when a portion of the preview image is being displayed and when a live feed is being displayed.

In some implementations, the communication device 270 may store multiple different preview images each corresponding to a different condition, e.g., morning, afternoon, or night time, in which images used to generate the preview image were captured. When a request to change the viewing angle is received, the communication device 270 may determine a current condition, determine the preview image corresponding to the condition that most closely matches the current condition, and select the preview image with the corresponding condition determined to most closely match the current condition.

In some implementations, the data acquisition device 230 may generate the preview image from multiple images taken by the data acquisition device 230 at different viewing angles that are stitched together and provide the preview image to the communication device 270. The data acquisition device 230 may generate the preview image and provide the preview image to the communication device 270 in response to a request from the communication device 270 or without a request from the communication device 270.

The communication device 270, in response to receiving the request to change the viewing angle, determines a portion of the preview image that corresponds to the viewing angle after the viewing angle is changed according to the request (540). For instance, the communication device 270 may determine that the request to change the viewing angle indicates a change of ninety degrees to the right, and in response, determine that a portion of the preview image corresponding to ninety degrees to the right from the current viewing angle corresponds to the viewing angle after the viewing angle is changed according to the request.

The communication device 270 provides, on the display of the device, the portion of the preview image that corresponds to the viewing angle after the viewing angle is changed according to the request (550). For instance, when the communication device 270 detects that the user is beginning a swipe motion or has touched an image of a live feed for a current view displayed in a graphical user interface, the communication device 270 may replace a live feed of a current view with a corresponding portion of the preview image and allow the user to change the portion of the preview image that is displayed as the user moves their finger to change the viewing angle. For example, if the communication device 270 detects that the user is moving the user's finger continuously to the right, the communication device 270 may replace the current view with corresponding portions of the preview image by continuously selecting portions more and more to the right in the preview image.

In some implementations, the communication device 270 may indicate that the portion of the preview image displayed is a portion of the preview image and not a current view from a live feed of the data acquisition device 230. For instance, the communication device 270 may display the preview image in grayscale, in a black and white lines, with a colored outline, with a label, or with some other indication.

The communication device 270 causes the camera to move so that the viewing angle of the camera moves according to the request to move the viewing angle of the camera (560). For instance, when the communication device 270 determines that a user has finished swiping, e.g., the user has lifted their finger for more than one second, the communication device 270 may determine a viewing angle corresponding to the portion of the preview image currently being displayed and may provide instructions to the data acquisition device 230 that cause the data acquisition device 230 to pan and/or tilt until the viewing angle of the data acquisition device 230 matches the viewing angle corresponding to the portion of the preview image currently being displayed. In some implementations, the instructions may be to move by a particular coordinate offset. In other implementations, the instructions may be to move to a particular coordinate offset.

The communication device 270 determines that a view of the camera after the viewing angle of the camera is moved according to the request is available (570). For instance, the communication device 270 may determine that an indication that the data acquisition device 230 has finished panning and/or tilting to a new viewing angle corresponding to the request has been received from the data acquisition device 230, and that a live video feed is being received from the data acquisition device 230 and can be displayed.

In response to determining that the view of the camera after the viewing angle of the camera is moved according to the request is available, the communication device 270 may replace the portion of the preview image with the view of the camera after the viewing angle of the camera is moved according to the request (580). For example, the communication device 270 may replace in a graphical user interface a portion of a preview image with a live feed from the data acquisition device 230 at a corresponding viewing angle.

The described device and techniques may be implemented in any material and using any process capable of forming the described structures and of performing the described actions. The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining a preview image that was generated, prior to receipt of a request to change a viewing angle, from aggregation of multiple images obtained by a camera where each of the multiple images was obtained when the camera had a respective different viewing angle;
providing, on a display of a device, a first view of the camera according to the viewing angle at a first viewing angle;
receiving the request to change the viewing angle to a second viewing angle;
in response to receiving the request to change the viewing angle to the second viewing angle, determining a portion of the preview image that corresponds to the second viewing angle;
determining that the first view of the camera according to the viewing angle at the first viewing angle is different than the portion of the preview image that corresponds to the first viewing angle because of a lighting change;
in response to determining that the first view of the camera according to the viewing angle at the first viewing angle is different than the portion of the preview image that corresponds to the first viewing angle because of a lighting change, providing, on the display of the device, the portion of the preview image that corresponds to the second viewing angle with alterations;
causing the camera to move so that the viewing angle of the camera changes to the second viewing angle;
determining that the camera has moved so that a second view of the camera according to the viewing angle at the second viewing angle is available; and
in response to determining that the camera has moved so that the second view of the camera according to the viewing angle at the second viewing angle is available, replacing, on the display of the device, the portion of the preview image that corresponds to the second viewing angle with the second view of the camera according to the viewing angle at the second viewing angle.

2. The method of claim 1, wherein providing the portion of the preview image that corresponds to the second viewing angle comprises replacing the first view of the camera with the portion of the preview image that corresponds to the second viewing angle of the camera.

3. The method of claim 1, wherein causing the camera to move comprises providing instructions that cause the camera to one or more of pan or tilt.

4. The method of claim 1, wherein determining the portion of the preview image that corresponds to the second viewing angle comprises:
determining the portion of the preview image that corresponds to the image that was previously obtained when the camera was at the second viewing angle and obtained before the receipt of the request.

5. The method of claim 1, wherein the first view and the second view of the camera comprise live video.

6. The method of claim 1, wherein providing the first view of the camera according to the first viewing angle comprises:
providing the first view of the camera in a graphical user interface,
wherein the request to change the viewing angle is received through the graphical user interface.

7. The method of claim 6, wherein the request to change the viewing angle comprises a swipe on the first view of the camera in the graphical user interface.

8. The method of claim 7, wherein determining that the second view of the camera according to the viewing angle at the second viewing angle is available comprises:
determining that the camera has finished moving and that the second view is being received from the camera.

9. The method of claim 1, wherein obtaining the preview image that was generated, prior to receipt of the request to change the viewing angle, from aggregation of multiple images obtained by the camera where each of the multiple images was obtained when the camera had the respective different viewing angle comprises:
prior to receiving the request, panning and tilting the camera about the camera's full range of motion to obtain the images from the different viewing angles of the camera.

10. The method of claim 9, comprising:
determining that a view of the camera is not being displayed on the device; and
in response to determining that a view of the camera is not being displayed on the device, instructing the camera to pan and tilt about the camera's full range of motion to obtain the images from the different viewing angles of the camera.

11. The method of claim 1, comprising:
determining that the portion of the preview image corresponding to the first viewing angle of the camera is different than the first view of the camera; and
in response to determining that the portion of the preview image corresponding to the first viewing angle of camera is different than the first view of the camera, re-generating the preview image.

12. The method of claim 1, wherein obtaining the preview image that was generated, prior to receipt of the request to change the viewing angle, from aggregation of multiple images obtained by the camera where each of the multiple images was obtained when the camera had the respective different viewing angle, comprises:
  determining conditions in which each of multiple preview images were generated;
  determining a current condition matches the condition in which the preview image was generated; and
  selecting the preview image from the multiple preview images.

13. The method of claim 1, wherein the preview image comprises a three hundred sixty degree view.

14. The method of claim 1, wherein in response to determining that the first view of the camera according to the viewing angle at the first viewing angle is different than the portion of the preview image that corresponds to the first viewing angle, providing, on the display of the device, the portion of the preview image that corresponds to the second viewing angle with alterations comprises:
  providing the portion of the preview image that corresponds to the second viewing angle with alterations to the preview image that emphasize outlines around objects.

15. The method of claim 1, wherein causing the camera to move so that the viewing angle of the camera changes to the second viewing angle is in response to determining that an additional request to change the viewing angle to a third viewing angle has not been received within a pre-defined period of time after the request to change the viewing angle to the second viewing angle is received and before the camera moves so that the viewing angle of the camera changes to the second viewing angle.

16. The method of claim 1, wherein in response to determining that the first view of the camera according to the viewing angle at the first viewing angle is different than the portion of the preview image that corresponds to the first viewing angle, providing, on the display of the device, the portion of the preview image that corresponds to the second viewing angle with alterations comprises:
  identifying edges of objects in the portion of the preview image that corresponds to the second viewing angle; and
  generating a black and white line drawing based on the edges that are identified.

17. A system comprising:
  one or more computers and one or more storage devices storing instructions that are operable, when executed by the one or more computers, to cause the one or more computers to perform operations comprising:
  obtaining a preview image that was generated, prior to receipt of a request to change a viewing angle, from aggregation of multiple images obtained by a camera where each of the multiple images was obtained when the camera had a respective different viewing angle;
  providing, on a display of a device, a first view of the camera according to the viewing angle at a first viewing angle;
  receiving the request to change the viewing angle to a second viewing angle;
  in response to receiving the request to change the viewing angle to the second viewing angle, determining a portion of the preview image that corresponds to the second viewing angle;
  determining that the first view of the camera according to the viewing angle at the first viewing angle is different than the portion of the preview image that corresponds to the first viewing angle because of a lighting change;
  in response to determining that the first view of the camera according to the viewing angle at the first viewing angle is different than the portion of the preview image that corresponds to the first viewing angle because of a lighting change, providing, on the display of the device, the portion of the preview image that corresponds to the second viewing angle with alterations;
  causing the camera to move so that the viewing angle of the camera changes to the second viewing angle;
  determining that the camera has moved so that a second view of the camera according to the viewing angle at the second viewing angle is available; and
  in response to determining that the camera has moved so that the second view of the camera according to the viewing angle at the second viewing angle is available, replacing, on the display of the device, the portion of the preview image that corresponds to the second viewing angle with the second view of the camera according to the viewing angle at the second viewing angle.

18. The system of claim 17, wherein providing the portion of the preview image that corresponds to the second viewing angle comprises replacing the first view of the camera with the portion of the preview image that corresponds to the second viewing angle of the camera.

19. The system of claim 17, wherein causing the camera to move comprises providing instructions that cause the camera to one or more of pan or tilt.

20. A non-transitory computer-readable medium storing software comprising instructions executable by one or more computers which, upon such execution, cause the one or more computers to perform operations comprising:
  obtaining a preview image that was generated, prior to receipt of a request to change a viewing angle, from aggregation of multiple images obtained by a camera where each of the multiple images was obtained when the camera had a respective different viewing angle;
  providing, on a display of a device, a first view of the camera according to the viewing angle at a first viewing angle;
  receiving the request to change the viewing angle to a second viewing angle;
  in response to receiving the request to change the viewing angle to the second viewing angle, determining a portion of the preview image that corresponds to the second viewing angle;
  determining that the first view of the camera according to the viewing angle at the first viewing angle is different than the portion of the preview image that corresponds to the first viewing angle because of a lighting change;
  in response to determining that the first view of the camera according to the viewing angle at the first viewing angle is different than the portion of the preview image that corresponds to the first viewing angle because of a lighting change, providing, on the display of the device, the portion of the preview image that corresponds to the second viewing angle with alterations;
  causing the camera to move so that the viewing angle of the camera changes to the second viewing angle;
  determining that the camera has moved so that a second view of the camera according to the viewing angle at the second viewing angle is available; and
  in response to determining that the camera has moved so that the second view of the camera according to the viewing angle at the second viewing angle is available, replacing, on the display of the device, the portion of the preview image that corresponds to the second viewing angle with the second view of the camera according to the viewing angle at the second viewing angle.

* * * * *